(12) United States Patent
Pedzisz et al.

(10) Patent No.: US 12,439,065 B2
(45) Date of Patent: Oct. 7, 2025

(54) HYBRID INTER-FRAME CODING USING AN AUTOREGRESSIVE MODEL

(71) Applicant: Synaptics Incorporated, San Jose, CA (US)

(72) Inventors: Maciej Sebastian Pedzisz, Southampton (GB); Timothy John Borer, Cambridge (GB)

(73) Assignee: Synaptics Incorporated, San Jose, CA (US)

( * ) Notice: Subject to any disclaimer, the term of this patent is extended or adjusted under 35 U.S.C. 154(b) by 43 days.

(21) Appl. No.: 18/618,936

(22) Filed: Mar. 27, 2024

(65) Prior Publication Data

US 2024/0244237 A1     Jul. 18, 2024

Related U.S. Application Data

(63) Continuation of application No. 17/960,723, filed on Oct. 5, 2022, now Pat. No. 11,979,587.

(51) Int. Cl.
*H04N 19/30* (2014.01)
*H04N 19/13* (2014.01)
*H04N 19/182* (2014.01)

(52) U.S. Cl.
CPC .......... *H04N 19/30* (2014.11); *H04N 19/13* (2014.11); *H04N 19/182* (2014.11)

(58) Field of Classification Search
CPC ....... H04N 19/30; H04N 19/13; H04N 19/182
See application file for complete search history.

(56) References Cited

U.S. PATENT DOCUMENTS

| | | | |
|---|---|---|---|
| 9,609,343 B1 | 3/2017 | Chen et al. | |
| 2013/0222539 A1* | 8/2013 | Pahalawatta | H04N 19/14 348/43 |
| 2015/0063445 A1* | 3/2015 | Rose | G10L 19/24 375/240.03 |

(Continued)

OTHER PUBLICATIONS

Bull, D. R., & Zhang, F. (2021). Intelligent Image and Video Compression. Communicating Pictures (2nd ed.). London: Academic Press. (Description only—1 pg.).

(Continued)

*Primary Examiner* — Jae N Noh
(74) *Attorney, Agent, or Firm* — Paradice & Li LLP

(57) ABSTRACT

This disclosure provides methods, devices, and systems for video coding. The present implementations more specifically relate to hybrid coding techniques that combine aspects of inter-frame coding with aspects of intra-frame coding. In some aspects, a video encoder may perform inter-frame coding in a weighted manner so that the coded video frames (also referred to as "residual frames") may include contributions from the current video frame to be transmitted over a communication channel and also may include contributions from the previous video frame transmitted over the communication channel. More specifically, any pixel value ($r(n)$) in the residual frame can be expressed as a weighted combination of a respective pixel value ($x(n)$) in the current video frame and a co-located pixel value ($x(n-1)$) in the previous video frame, where $r(n)=x(n)-\alpha \cdot x(n-1)$ and where $0 \leq \alpha \leq 1$ is a scaling factor representing the degree of contribution by the previous video frame.

20 Claims, 11 Drawing Sheets

(56) References Cited

U.S. PATENT DOCUMENTS

2022/0256186 A1  8/2022  Mukherjee et al.

OTHER PUBLICATIONS

Cover, T. M., & Thomas, J. A. (2006). Elements of Information Theory (2nd ed.). New York: John Wiley & Sons, Retrived from http://staff.ustc.edu.cn/~cgong821/Wiley.Interscience.Elements.of.Information.Theory.Jul.2006.eBook-DDU.pdf on Oct. 5, 2022 (774 pgs.).
Gish, H., & Pierce, J. (Sep. 1968). Asymptotically efficient quantizing. IEEE Transactions on Information Theory, 14(5), 676-683. doi:10.1109/TIT.1968.1054193.
Goyal, S. K., & O'Neal, J. B. (Jun. 1975). Entropy coded differential pulse-code modulation systems for television. IEEE Transactions on Communications, 23(6), 660-666. doi:10.1109/TCOM.1975.1092860.
Oppenheim, A. V., Schafer, R. W., & Buck, J. R. (1999). Discrete-Time Signal Processing (2nd ed.). Upper Saddle River: Prentice-Hall International. Retrieved from https://research.iaun.ac.ir/pd/naghsh/pdfs/UploadFile_2230.pdf on Oct. 5, 2022 (893 pgs.).
Seltman, H. J. (Jul. 11, 2018). Experimental Design and Analysis. Retrieved from https://www.stat.cmu.edu/~hseltman/309/Book/Book.pdf on Oct. 5, 2022 (428 pgs.).
Wiegand, T., & Schwarz, H. (Jan. 2011). Source Coding: Part I of Fundamentals of Source and Video Coding. Foundations and Trends in Signal Processing, 4(1-2), 1-222. doi:10.1561/2000000010. Retrieved from https://iphome.hhi.de/wiegand/assets/pdfs/VBpart1.pdf on Oct. 5, 2022, (224 pages).
Search Report, dated Mar. 19, 2024, issued in Great Britain Patent Application No. GB2315189.7, pp. 1-4.

\* cited by examiner

HYBRID INTER-FRAME CODING USING AN AUTOREGRESSIVE MODEL

CROSS REFERENCE TO RELATED APPLICATIONS

This application is a continuation of U.S. patent application Ser. No. 17/960,723 filed Oct. 5, 2022, entitled "HYBRID INTER-FRAME CODING USING AN AUTOREGRESSIVE MODEL," which is assigned to the assignee hereof. The disclosure of the prior application is considered part of and is incorporated by reference in this patent application.

TECHNICAL FIELD

The present implementations relate generally to video coding, and specifically to hybrid inter-frame coding using an autoregressive model.

BACKGROUND OF RELATED ART

A digital video is a sequence of digital images (or "frames") that can be displayed or otherwise rendered in succession (such as by a video playback device). Each digital image can be represented by an array of pixel values (or multiple arrays of pixel values associated with different channels). Some video playback devices may receive the sequence of images, over a communication channel (such as a wired or wireless medium), from a source device (such as an image capture device or video data repository). Due to bandwidth limitations of the communication channel, digital image data is often encoded or compressed prior to transmission by the source device. Data compression is a technique for encoding information into smaller units of data. As such, data compression can be used to reduce the bandwidth or overhead needed to store or transmit video frames over the communication channel.

Example video coding techniques include "intra-frame" coding and "inter-frame" coding. Intra-frame coding (also referred to as "intra-coding") techniques can be used to encode individual frames of video as independent images (rather than a temporal sequence of images). In other words, the pixel values of an intra-coded video frame can be decoded in isolation or without knowledge of any other frames of video. However, adjacent frames of video (such as images displayed successively in time) are likely to be the same or substantially similar in appearance. Thus, inter-frame coding (also referred to as "inter-coding" or "differential" coding) techniques can be used to transmit only the differences between successive video frames. In other words, an inter-coded video frame must be combined with one or more previous frames of video to recover the actual pixel values to be displayed.

Inter-frame coding generally results in higher compression than intra-frame coding but also results in higher latency, which may not be suitable for video playback applications (such as docking or extended reality (XR) applications). When intra-coded frames are transmitted over a lossy channel (such as a wireless communication channel), the loss of one or more frames may result in noticeable errors in the displayed image. To "heal" the image (or restore image quality), the video encoder must transmit an intra-coded frame to the video decoder. However, intra-frame coding requires a relatively high data rate which can be difficult to achieve under varying channel conditions (characteristic of wireless communications). Thus, new video coding techniques may be needed to transmit video frames over a lossy channel, with varying channel capacity, while meeting the latency requirements associated with video playback.

SUMMARY

This Summary is provided to introduce in a simplified form a selection of concepts that are further described below in the Detailed Description. This Summary is not intended to identify key features or essential features of the claimed subject matter, nor is it intended to limit the scope of the claimed subject matter.

One innovative aspect of the subject matter of this disclosure can be implemented in a method of video coding. The method includes steps of transmitting, over a communication channel, one or more first codewords associated with a first image in a sequence of images; decoding the one or more first codewords as a plurality of first pixel values according to one or more coding schemes; scaling the plurality of first pixel values by a scaling factor associated with one or more properties of the communication channel; obtaining a plurality of difference values representing differences between the plurality of scaled first pixel values and a plurality of second pixel values, respectively, associated with a second image that follows the first image in the sequence of images; encoding the plurality of difference values as one or more second codewords according to the one or more coding schemes; and transmitting the one or more second codewords over the communication channel.

Another innovative aspect of the subject matter of this disclosure can be implemented in an encoder that includes a processing system and a memory. The memory stores instructions that, when executed by the processing system, cause the encoder to transmit, over a communication channel, one or more first codewords associated with a first image in a sequence of images; decode the one or more first codewords as a plurality of first pixel values according to one or more coding schemes; scale the plurality of first pixel values by a scaling factor associated with one or more properties of the communication channel; obtain a plurality of difference values representing differences between the plurality of scaled first pixel values and a plurality of second pixel values, respectively, associated with a second image that follows the first image in the sequence of images; encode the plurality of difference values as one or more second codewords according to the one or more coding schemes; and transmit the one or more second codewords over the communication channel.

Another innovative aspect of the subject matter of this disclosure can be implemented in a method of video coding. The method includes steps of transmitting, over a communication channel, one or more first codewords associated with a first image in a sequence of images; decoding the one or more first codewords as a plurality of first pixel values according to one or more coding schemes; determining a scaling factor based at least in part on the plurality of first pixel values and a plurality of second pixel values associated with a second image that follows the first image in the sequence of images; scaling the plurality of first pixel values by the scaling factor; obtaining a plurality of difference values representing differences between the plurality of scaled first pixel values and the plurality of second pixel values, respectively; encoding the plurality of difference values as one or more second codewords according to the one or more coding schemes; and transmitting the one or more second codewords over the communication channel.

BRIEF DESCRIPTION OF THE DRAWINGS

The present implementations are illustrated by way of example and are not intended to be limited by the figures of the accompanying drawings.

DETAILED DESCRIPTION

Figure 1:
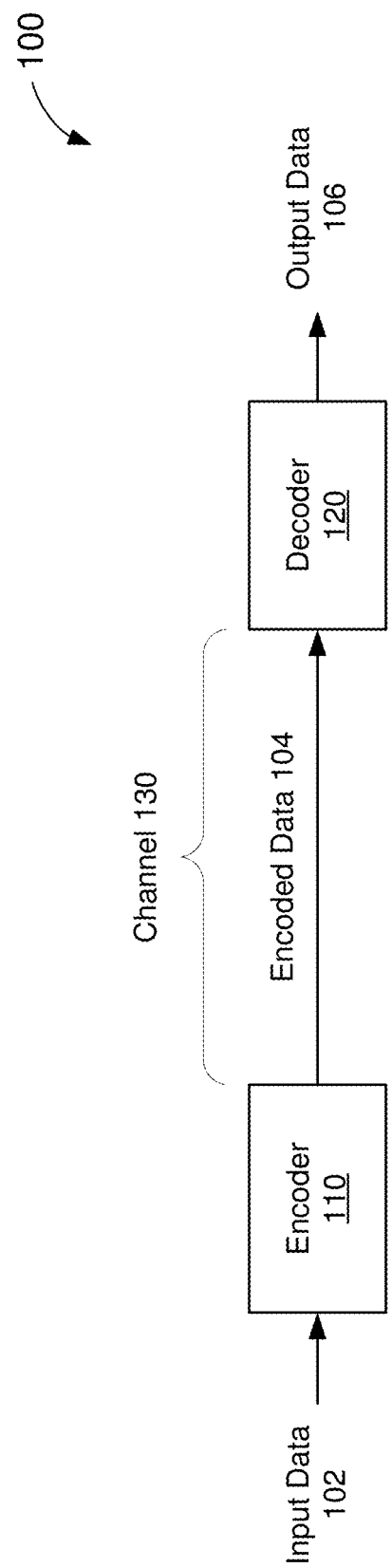
FIG. 1 shows an example communication system for encoding and decoding data.

In the following description, numerous specific details are set forth such as examples of specific components, circuits, and processes to provide a thorough understanding of the present disclosure. The term "coupled" as used herein means connected directly to or connected through one or more intervening components or circuits. The terms "electronic system" and "electronic device" may be used interchangeably to refer to any system capable of electronically processing information. Also, in the following description and for purposes of explanation, specific nomenclature is set forth to provide a thorough understanding of the aspects of the disclosure. However, it will be apparent to one skilled in the art that these specific details may not be required to practice the example embodiments. In other instances, well-known circuits and devices are shown in block diagram form to avoid obscuring the present disclosure. Some portions of the detailed descriptions which follow are presented in terms of procedures, logic blocks, processing and other symbolic representations of operations on data bits within a computer memory.

These descriptions and representations are the means used by those skilled in the data processing arts to most effectively convey the substance of their work to others skilled in the art. In the present disclosure, a procedure, logic block, process, or the like, is conceived to be a self-consistent sequence of steps or instructions leading to a desired result. The steps are those requiring physical manipulations of physical quantities. Usually, although not necessarily, these quantities take the form of electrical or magnetic signals capable of being stored, transferred, combined, compared, and otherwise manipulated in a computer system. It should be borne in mind, however, that all of these and similar terms are to be associated with the appropriate physical quantities and are merely convenient labels applied to these quantities.

Unless specifically stated otherwise as apparent from the following discussions, it is appreciated that throughout the present application, discussions utilizing the terms such as "accessing," "receiving," "sending," "using," "selecting," "determining," "normalizing," "multiplying," "averaging," "monitoring," "comparing," "applying," "updating," "measuring," "deriving" or the like, refer to the actions and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

In the figures, a single block may be described as performing a function or functions; however, in actual practice, the function or functions performed by that block may be performed in a single component or across multiple components, and/or may be performed using hardware, using software, or using a combination of hardware and software. To clearly illustrate this interchangeability of hardware and software, various illustrative components, blocks, modules, circuits, and steps have been described below generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Also, the example input devices may include components other than those shown, including well-known components such as a processor, memory and the like.

The techniques described herein may be implemented in hardware, software, firmware, or any combination thereof, unless specifically described as being implemented in a specific manner. Any features described as modules or components may also be implemented together in an integrated logic device or separately as discrete but interoperable logic devices. If implemented in software, the techniques may be realized at least in part by a non-transitory processor-readable storage medium including instructions that, when executed, performs one or more of the methods described above. The non-transitory processor-readable data storage medium may form part of a computer program product, which may include packaging materials.

The non-transitory processor-readable storage medium may comprise random access memory (RAM) such as synchronous dynamic random-access memory (SDRAM), read only memory (ROM), non-volatile random access memory (NVRAM), electrically erasable programmable read-only memory (EEPROM), FLASH memory, other known storage media, and the like. The techniques additionally, or alternatively, may be realized at least in part by a processor-readable communication medium that carries or communicates code in the form of instructions or data structures and that can be accessed, read, and/or executed by a computer or other processor.

The various illustrative logical blocks, modules, circuits and instructions described in connection with the embodiments disclosed herein may be executed by one or more processors (or a processing system). The term "processor," as used herein may refer to any general-purpose processor, special-purpose processor, conventional processor, controller, microcontroller, and/or state machine capable of executing scripts or instructions of one or more software programs stored in memory.

As described above, intra-frame coding can overcome some of the limitations associated with lossy channel conditions (such as by healing the displayed image) while inter-frame coding can overcome some of the limitations associated with varying channel capacity (such as by lowering the data rate of video frame transmissions). Aspects of the present disclosure recognize that many wireless communication channels are lossy and have varying channel capacity. Thus, a "hybrid" coding technique, which combines aspects of inter-frame coding with aspects of intra-frame coding, may achieve an optimal balance of compression and image quality for video frames transmitted over a wireless communication channel.

Various aspects relate generally to video coding, and more particularly, to hybrid coding techniques that combine aspects of inter-frame coding with aspects of intra-frame coding. In some aspects, a video encoder may perform inter-frame coding in a weighted manner so that the coded video frames (also referred to as "residual frames") may include contributions from the current video frame to be transmitted over a communication channel and also may include contributions from the previous video frame transmitted over the communication channel. More specifically, any pixel value (r(n)) in the residual frame can be expressed as a weighted combination of a respective pixel value (x(n)) in the current video frame and a co-located pixel value (x(n−1)) in the previous video frame:

$$r(n) = x(n) - \alpha \cdot x(n-1)$$

where $0 \leq \alpha \leq 1$ is a scaling factor representing the degree of contribution by the previous video frame (and thus, the degree of contribution by the current video frame). As used herein, the term "co-located pixel values" refers to pixel values that map to, or are otherwise associated with, the same relative location (such as the top-left corner of an image) in different video frames.

In some implementations, the scaling factor $\alpha$ may be associated with one or more properties (such as a channel loss or a channel capacity) of the communication channel. In some other implementations, the scaling factor $\alpha$ may be dynamically calculated based on spatial-temporal characteristics of the current video frame and the previous video frame. For example, the scaling factor $\alpha$ may be determined based on a standard deviation ($\sigma_x$) of a random variable (X) associated with the current video frame, a standard deviation ($\sigma_y$) of a random variable (Y) associated with the previous video frame, and a correlation ($\rho$) between X and Y, where $$\alpha = \rho \frac{\sigma_X}{\sigma_Y}.$$

In such implementations, the scaling factor $\alpha$ may be referred to as a spatial-temporal inter-coding (STIC) scaling factor. Aspects of the present disclosure recognize that the spatial-temporal characteristics of a video frame may be indicative of the type of video content included therein. Thus, in some implementations, the STIC scaling factors associated with the current video frame can be used to assign a content-type classification to the current video frame.

Particular implementations of the subject matter described in this disclosure can be implemented to realize one or more of the following potential advantages. By combining aspects of inter-frame coding with aspects of intra-frame coding, the hybrid coding techniques of the present implementations may achieve an optimal balance of compression and image quality for video frames transmitted over a wireless communication channel. For example, the scaling factor $\alpha$ can be configured to ensure that each residual frame transmitted over a lossy channel includes at least some contribution from the current video frame so that the video decoder can dynamically repair or heal the displayed image if one or more residual frames are lost in transmission (or to prevent the displayed image from becoming "stuck"). Further, the STIC scaling factor $\alpha$ can adjust the compression of each residual frame to adapt the data rate of the transmissions to varying channel capacity while ensuring that the displayed image is optimized for human visual perception. By classifying each video frame by content type, aspects of the present disclosure may further adjust an amount of quantization or compression used to encode each residual frame for transmission over the communication channel while maintaining a desired image quality.

FIG. 1 shows an example communication system 100 for encoding and decoding data. The communication system 100 includes an encoder 110 and a decoder 120. In some implementations, the encoder 110 and decoder 120 may be provided in respective communication devices such as, for example, computers, switches, routers, hubs, gateways, cameras, displays, or other devices capable of transmitting or receiving communication signals. In some other implementations, the encoder 110 and decoder 120 may be included in the same device or system.

The encoder 110 receives input data 102 to be transmitted or stored via a channel 130. For example, the channel 130 may include a wired or wireless communication medium that facilities communications between the encoder 110 and the decoder 120. Alternatively, or in addition, the channel 130 may include a data storage medium. In some aspects, the encoder 110 may be configured to compress the size of the input data 102 to accommodate the bandwidth, storage, or other resource limitations associated with the channel 130. For example, the encoder 110 may encode each unit of input data 102 as a respective "codeword" that can be transmitted or stored over the channel 130 (as encoded data 104). The decoder 120 is configured to receive the encoded data 104, via the channel 130, and decode the encoded data 104 as output data 106. For example, the decoder 120 may decompress or otherwise reverse the compression performed by the encoder 110 so that the output data 106 is substantially similar, if not identical, to the original input data 102.

Data compression techniques can be generally categorized as "lossy" or "lossless." Lossy data compression may result in some loss of information between the encoding and decoding steps. As a result of lossy compression, the output data 106 may be different than the input data 102. Example lossy compression techniques may include, among other examples, transform coding (such as through application of a spatial-frequency transform) and quantization (such as through application of a quantization matrix). In contrast, lossless data compression does not result in any loss of information between the encoding and decoding steps as long as the channel 130 does not introduce errors into the encoded data 104. As a result of lossless compression, the output data 106 is identical to the input data 102. Example lossless compression techniques may include, among other examples, entropy encoding (such as arithmetic coding, Huffman coding, or Golomb coding) and run-length encoding (RLE).

Figure 2:
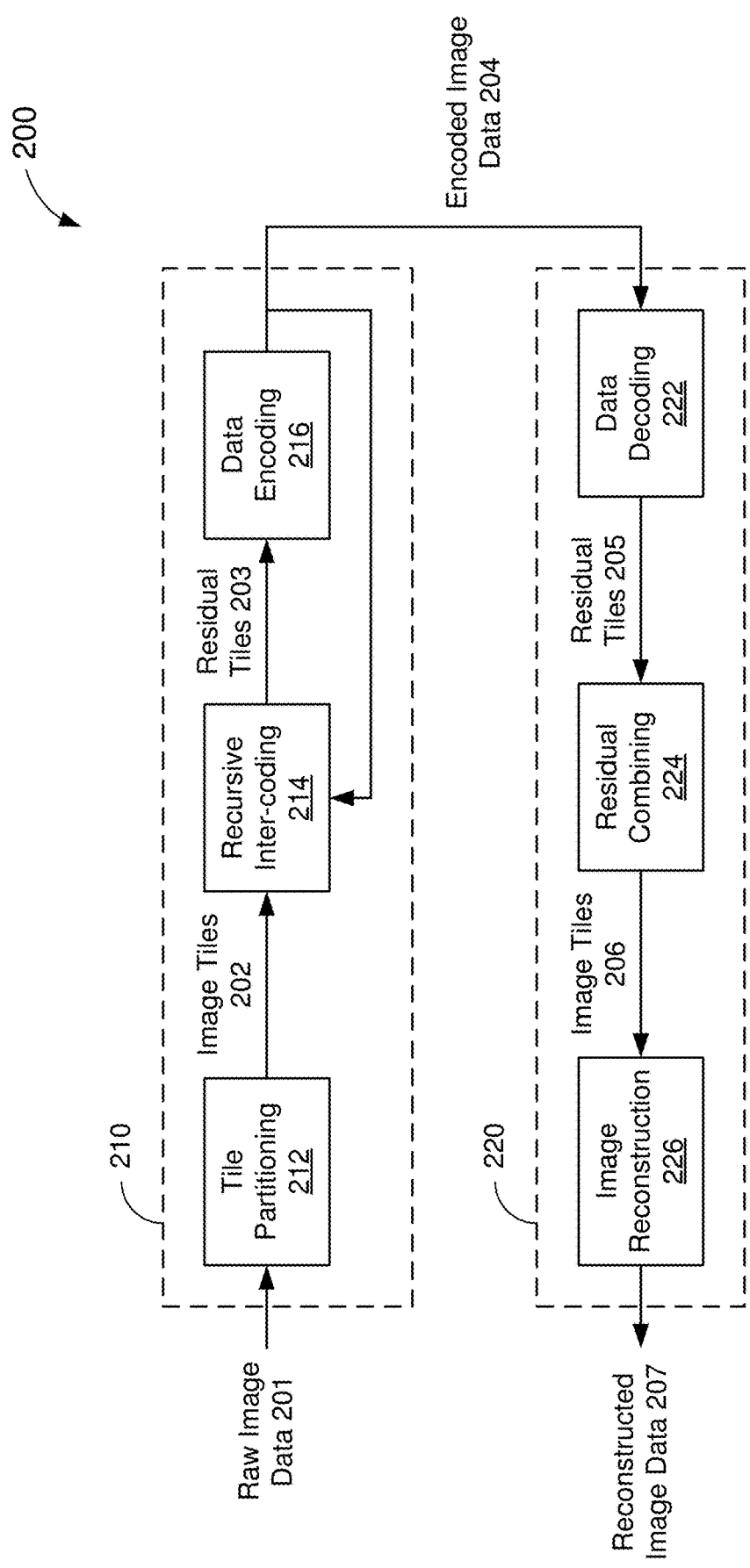
FIG. 2 shows a block diagram of an example video transmission system, according to some implementations.

FIG. 2 shows a block diagram of an example video transmission system 200, according to some implementations. The system 200 includes a video encoder 210 and a video decoder 220. In some implementations, the video encoder 210 and the video decoder 220 may be examples of the encoder 110 and decoder 120, respectively, of FIG. 1. Thus, the video encoder 210 may be communicatively coupled to the video decoder 220 via a channel (such as the channel 130 of FIG. 1). In some aspects, the channel may be a wireless communication channel. In some implementations, the channel may be a lossy channel. In some other implementations, the channel may have a varying channel capacity.

The video encoder 210 is configured to encode raw image data 201, as encoded image data 204, for transmission to the decoder 220. For example, a frame of raw image data 201 may include an array of pixel values (or multiple arrays of pixel values associated with different color channels) representing a digital image or frame of video captured or acquired by an image source (such as a camera or other image output device). In some aspects, the video encoder 210 may transmit a sequence of frames of encoded image data 204 each representing a respective image or frame of a digital video.

The video decoder 220 is configured to decode the encoded image data 204, as reconstructed image data 207, for display on a display device (such as a television, computer monitor, smartphone, or any other device that includes an electronic display). More specifically, the video decoder 220 may reverse the encoding performed by the video encoder 210 so that the reconstructed image data 207 is substantially similar, if not identical, to the raw image data 201. In some aspects, the video decoder 220 may display or render a sequence of frames of reconstructed image data 207 on the display device.

In some implementations, the video encoder 210 may include a tile partitioning component 212, a recursive inter-coding component 214, and a data encoding component 216. The tile partitioning component 212 partitions or subdivides each frame of raw image data 201 into a number of image tiles 202. Each image tile 202 includes a subset of pixel values, from the frame of raw image data 201, representing a respective portion or region of the digital image. As used herein, the term "co-located image tiles" refers to image tiles that map to, or are otherwise associated with, the same relative location (such as the top-left corner of an image) in different video frames.

In some aspects, the recursive inter-coding component 214 may inter-code each image tile 202, as a respective residual tile 203, based on an autoregressive (or recursive) model. More specifically, for each image tile 202 to be encoded, the recursive inter-coding component 214 may reconstruct a respective co-located image tile based on the encoded image data 204. In some implementations, the recursive inter-coding component 214 may scale each pixel value (x(n−1)) in a reconstructed image tile by a scaling factor ($\alpha$) and compute the pixel values (r(n)) for a residual tile 203 as the differences between the scaled pixel values and the pixel values (x(n)) of the current image tile 202 (of the $n^{th}$ frame) to be encoded, where r(n)=x(n)−$\alpha$·x(n−1). In some aspects, the recursive inter-coding component 214 may provide the value of each scaling factor $\alpha$ to the data encoding component 216.

The data encoding component 216 is configured to encode each of the residual tiles 203 as one or more codewords, of the encoded image data 204, according to one or more coding schemes. In some implementations, the data encoding component 216 may perform lossy or lossless compression on the residual tiles 203, for example, to further reduce the amount of encoded image data 204 transmitted over the channel (to the video decoder 220). In some other implementations, the data encoding component 216 may further encode or otherwise perform additional processing on the residual tiles 203. Example suitable coding techniques include spatial-frequency transformation and quantization, among other examples. In some aspects, the data encoding component 216 may further encode each scaling factor $\alpha$ for transmission over the channel (to the video decoder 220).

In some implementations, the video decoder 220 may include a data decoding component 222, a residual combining component 224, and an image reconstruction component 226. The data decoding component 222 is configured to decode each frame of encoded image data 204 as a series of decoded residual tiles 205. More specifically, the data decoding component 222 may reverse the encoding performed by the data encoding component 216. For example, the data decoding component 222 may decode the codewords included in each frame of encoded image data 204 (according to the same coding schemes implemented by the video encoder 210) to recover the residual tiles 203 produced by the recursive inter-coding component 214. In some aspects, the data decoding component 222 may further decode the value of each scaling factor $\alpha$ received from the video encoder 210.

The residual combining component 224 combines each decoded residual tile 205 with a co-located image tile that was previously reconstructed by the residual combining component 224 to reconstruct a respective image tile 206. More specifically, the residual combining component 224 may reverse the inter-frame coding performed by the recursive inter-coding component 214 to recover the original image tiles 202 output by the tile partitioning component 212. For example, the residual combining component 224 may recover the pixel values (y(n)) of a reconstructed image tile 206 by summing the pixel values r(n) in the decoded residual tile 205 with a weighted version of the co-located pixel values (y(n−1)) in the previously reconstructed image tile, where y(n)=r(n)+$\alpha$ y(n−1).

The image reconstruction component 226 aggregates the reconstructed image tiles 206 as reconstructed image data 207. More specifically, the image reconstruction component 226 may reverse the partitioning performed by the tile partitioning component 212, for example, by reassembling the reconstructed image tiles 206 into a frame of reconstructed image data 207 that resembles the frame of raw image data 201 encoded by the video encoder 210. The reconstructed image data 207 can further be displayed or otherwise rendered as a digital image on an electronic display.

As described above, the loss of one or more fully inter-coded video frames or tiles (where $\alpha$=1) over the communication channel can result in errors, or a degradation of quality, in the displayed image. In some aspects, the scaling factor $\alpha$ can be configured to mitigate the loss of one or more residual tiles. For example, by setting the scaling factor $\alpha$ to a value less than 1 (but greater than 0) the residual tile r(n) includes contributions from the current image tile x(n) and the reconstructed image tile x(n−1). As a result, the video decoder 220 can gradually heal or repair errors in the displayed image (due to lost frames or quantization). In some implementations, the video encoder 210 may dynamically vary the scaling factor α for successive video frames (for example, between α=¾ and α=1) to reduce the frequency of frame updates while smoothing the healing of the displayed image.

Figure 3:
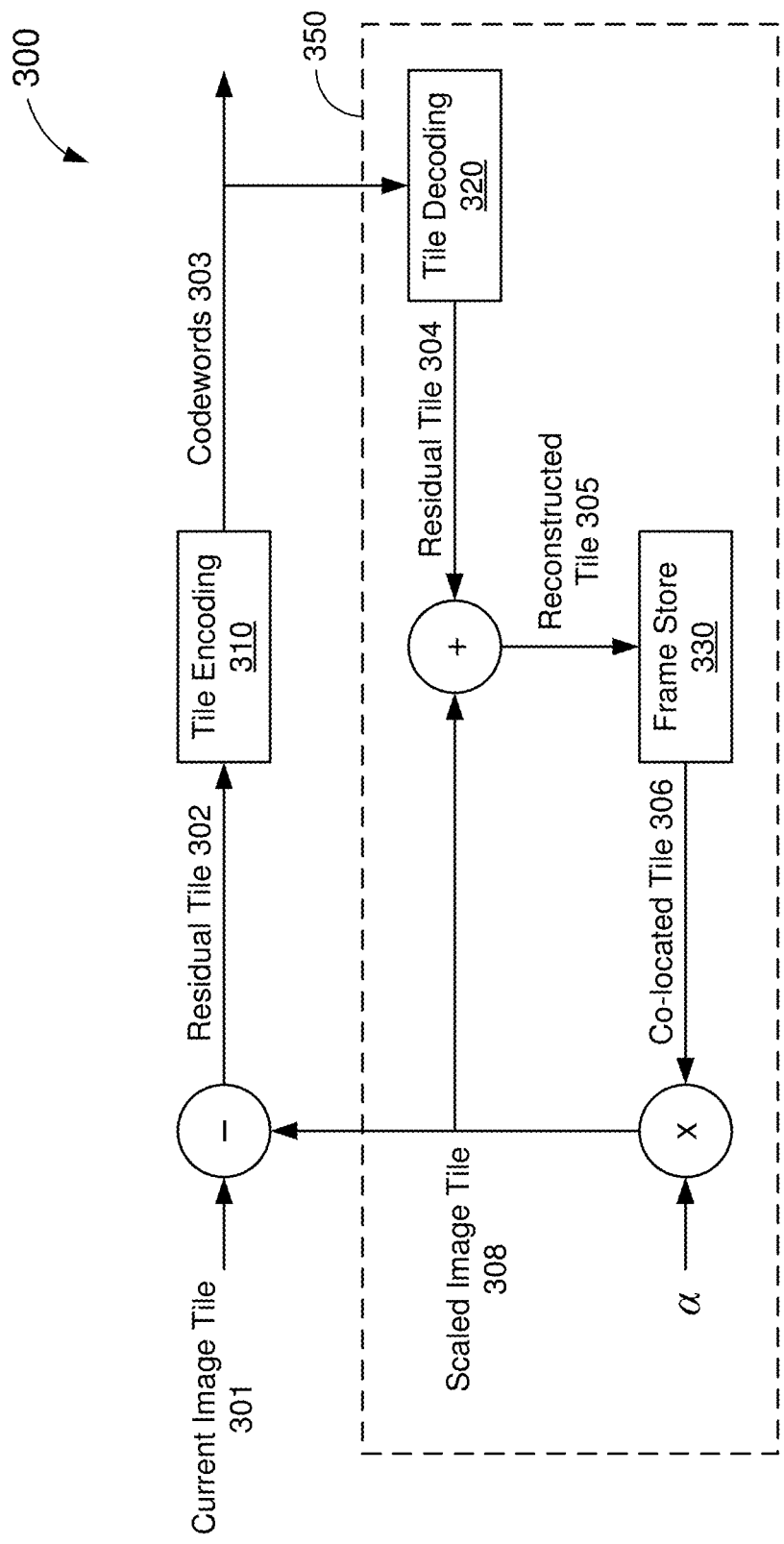
FIG. 3 shows a block diagram of an example video encoding system, according to some implementations.

FIG. 3 shows a block diagram of an example video encoding system 300, according to some implementations. In some implementations, the video encoding system 300 may be one example of the video encoder 210 of FIG. 2. More specifically, the video encoding system 300 may encode a current image tile 301, as one or more codewords 303, based on a recursive hybrid inter-coding process. With reference for example to FIG. 2, the current image tile 301 may be one example of any of the image tiles 202 and the codewords 303 may be one example of the encoded image data 204.

The video encoding system 300 includes a tile encoding component 310 and a recursive feedback loop 350 that includes a tile decoding component 320 and a frame store 330. In some implementations, the frame store 330 may store image data associated with a previous video frame. More specifically, the frame store 330 may store at least a co-located image tile 306 associated with a previous video frame. For example, if the current image tile 301 is the $i^{th}$ image tile of the $n^{th}$ video frame, the co-located image tile 306 may represent the $i^{th}$ image tile in the n−1th video frame.

In some aspects, the co-located image tile 306 may be scaled by a scaling factor (α) to produce a scaled image tile 308 which may be combined with the current image tile 301 to produce a residual tile 302. For example, each pixel value (x(n−1)) in the co-located image tile 306 may be multiplied by the scaling factor α and subtracted from a co-located pixel value (x(n)) in the current image tile 301 to produce a respective pixel value (r(n)) in the residual tile 302, where r(n)=x(n)−α·x(n−1).

The tile encoding component 310 encodes the residual tile 302 as the one or more codewords 303 according to one or more coding schemes. In some implementations, the tile encoding component 310 may be one example of the data encoding component 216 of FIG. 2. For example, the tile encoding component 310 may perform lossy or lossless compression on the residual tile 302. Alternatively, or in addition, the tile encoding component 310 may apply a spatial-frequency transformation or quantization to the residual tile 302.

The tile decoding component 320 is configured to decode the one or more codewords 303 as a residual tile 304. In some implementations, the tile decoding component 320 may reverse the encoding performed by the tile encoding component 310. As such, the residual tile 304 may be substantially similar (if not identical) to the residual tile 302 that was recently encoded. The residual tile 304 is further combined with the scaled image tile 308 to produce a reconstructed image tile 305.

In some implementations, the combining of the residual tile 304 with the scaled image tile 308 may reverse the inter-coding of the current image tile 301 with the scaled image tile 308. For example, each pixel value (r'(n)) in the residual tile 304 may be summed with a co-located pixel value in the scaled image tile 308 to produce a respective pixel value (y(n)) in the reconstructed image tile 305, where y(n)=r'(n)+α·x(n−1). Thus, when the residual tile 304 is identical to the most recently encoded residual tile 302 (r'(n)=r(n)), the reconstructed image tile 305 is also identical to the current image tile 301 associated therewith (y(n)=x(n)).

Aspects of the present disclosure recognize that various coding techniques (such as lossy compression and quantization) may introduce noise or errors into codewords 303. As a result, the residual tile 304 may not be identical to the residual tile 302. However, because the recursive feedback loop 350 tracks the decoding operations performed by a video decoder (such as the video decoder 220 of FIG. 2), the reconstructed image tile 305 is a relatively accurate representation of the image tile that is reconstructed at the video decoder (such as any of the reconstructed image tiles 206). As a result, the codewords 303 may produce a relatively accurate or high-quality image at the video decoder.

As described above, the scaling factor α determines the contributions by each of the current image tile 301 and the scaled image tile 308 to the residual tile 302. In other words, the scaling factor α controls the degree to which the residual tile 302 is intra-coded and the degree to which the residual tile 302 is inter-coded. For example, the residual tile 302 may contain more intra-coding when the scaling factor α is closer to zero and may contain more inter-coding when the scaling factor α is close to 1. Aspects of the present disclosure recognize that intra-frame coding is well-suited for predicting spatial variations among the pixel values in a given video frame. By contrast, inter-frame coding is well-suited for predicting temporal changes between the pixel values in successive video frames.

Aspects of the present disclosure further recognize that some changes in pixel values may be more readily apparent or discernable to a human observer than others based on the spatial and temporal characteristics of the video frames. For example, high-frequency variations among the pixel values in a given frame (such as an image of a field of grass) may mask or hide relatively minor changes in pixel values between successive frames (such as a video of an insect landing on a blade of grass). By contrast, the same or similar changes in pixel values may be more apparent to a human observer when the surrounding pixel values are relatively flat (such as a video of the same insect flying against the backdrop of a clear blue sky).

Thus, the optimal combination of intra-frame coding and inter-frame coding may vary among the image tiles associated with a given video frame and also may vary among co-located image tiles associated with successive video frames. In some aspects, the video encoding system 300 may determine the scaling factor α to be applied to the co-located image tile 306 based on spatial and temporal characteristics of the current image tile 301 and the co-located image tile 306. In such aspects, the scaling factor α may be referred to as a spatial-temporal inter-coding (STIC) scaling factor.

Figure 4:
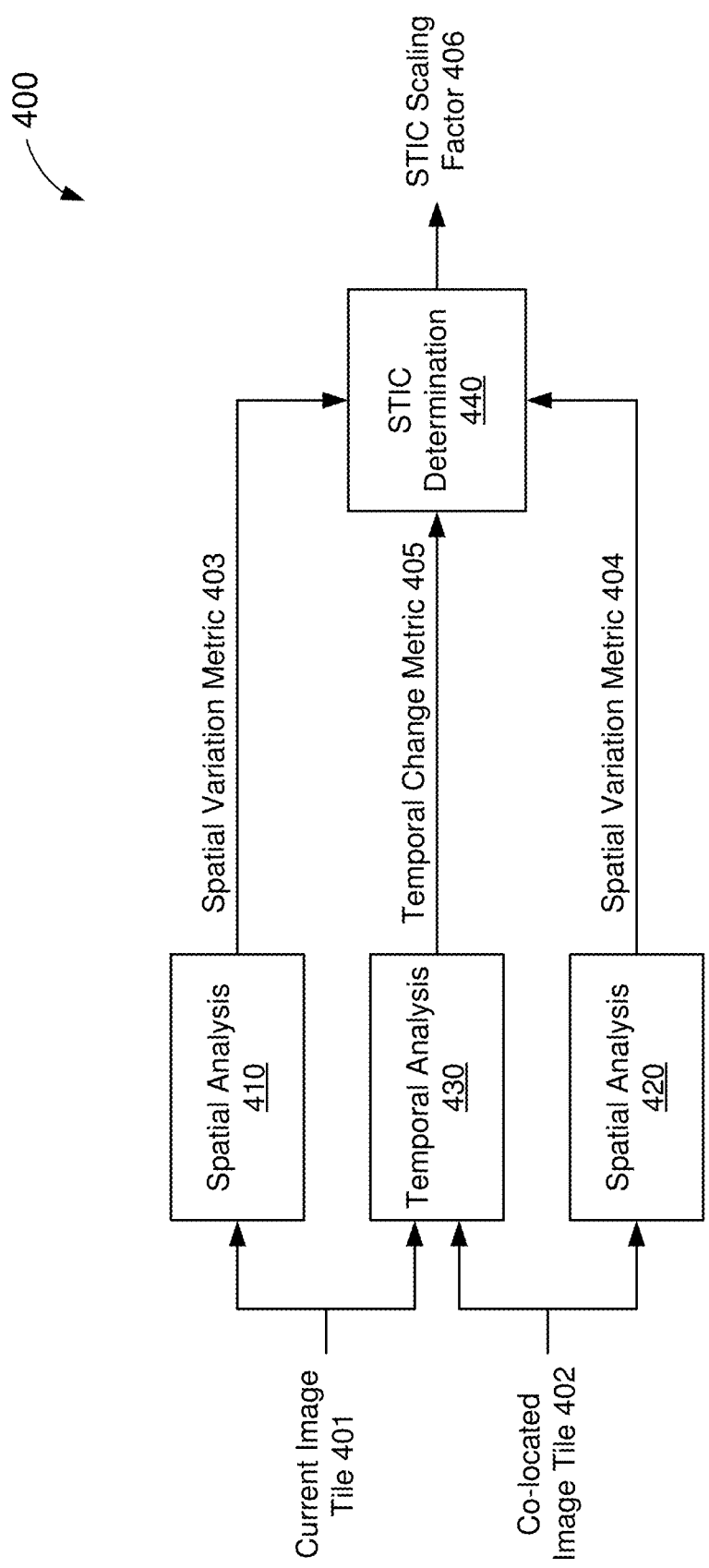
FIG. 4 shows a block diagram of an example scaling factor calculator, according to some implementations.

FIG. 4 shows a block diagram of an example scaling factor calculator 400, according to some implementations. In some implementations, the scaling factor calculator 400 may determine a STIC scaling factor 406 based on a current image tile 401 and a co-located image tile 402. In some implementations, the current image tile 401, the co-located image tile 402, and the STIC scaling factor 406 may be examples of the current image tile 301, the co-located image tile 306, and the scaling factor α, respectively, of FIG. 3. The scaling factor calculator 400 includes a first spatial analysis component 410, a second spatial analysis component 420, a temporal analysis component 430, and a STIC determination component 440.

The first spatial analysis component 410 is configured to determine a first spatial variation metric 403 associated with the current image tile 401. More specifically, the first spatial variation metric 403 may indicate an amount of spatial variation among the pixel values of the current image tile 401. In some implementations, the first spatial variation metric 403 may be a standard deviation ($\sigma_x$) of a random variable (X) associated with the pixel values in the current image tile 401.

The second spatial analysis component 420 is configured to determine a second spatial variation metric 404 associated with the co-located image tile 402. More specifically, the second spatial variation metric 404 may indicate an amount of spatial variation among the pixel values in the co-located image tile 402. In some implementations, the second spatial variation metric 404 may be a standard deviation ($\sigma_y$) of a random variable (Y) associated with the pixel values in the co-located image tile 402.

The temporal analysis component 430 is configured to determine a temporal change metric 405 associated with the current image tile 401 and the co-located image tile 402. More specifically, the temporal change metric 405 indicates an amount of temporal change between the pixel values of the current image tile 401 and the pixel values of the co-located image tile 402. In some implementations, the temporal change metric 403 may be a correlation ($\rho$) between the random variables X and Y:

$$\rho \triangleq \frac{E[XY] - E[X]E[Y]}{\sqrt{E[X^2] - E[X]^2}\sqrt{E[Y^2] - E[Y]^2}}$$

The STIC determination component 440 is configured to determine the STIC scaling factor 406 based on a combination of the first spatial variation metric 403, the second spatial variation matric 404, and the temporal change metric 405. In some implementations, the STIC scaling factor 406 may be a function of the standard deviation $\sigma_x$ of the current image tile 401, the standard deviation $\sigma_y$ of the co-located image tile 402, and the correlation $\rho$ between the current image tile 401 and the co-located image tile 402, where $\alpha$ is the STIC scaling factor 406:

$$\alpha = \rho \frac{\sigma_X}{\sigma_Y} \quad (1)$$

Equation 1 can also be rewritten in terms of a number (N) of possible outcomes ($x_i$) for the random variable X and the N possible outcomes ($y_i$) for the random variable Y:

$$\hat{\alpha} = \frac{E[XY] - E[X]E[Y]}{E[Y^2] - E[Y]^2} = \frac{\frac{1}{N}\sum_{i=1}^{N} x_i y_i - \frac{1}{N}\sum_{i=1}^{N} x_i \cdot \frac{1}{N}\sum_{i=1}^{N} y_i}{\frac{1}{N}\sum_{i=1}^{N} y_i^2 - \left(\frac{1}{N}\sum_{i=1}^{N} y_i\right)^2}$$

To avoid division by zero, the above equation can be further rewritten as:

$$\hat{\alpha} = \frac{N s_{xy} - s_x s_y}{N s_{yy} - s_y^2 + 1},$$

$$s_{xy} = \sum_{i=1}^{N} x_i y_i,$$

$$s_{yy} = \sum_{i=1}^{N} y_i^2,$$

$$s_y = \sum_{i=1}^{N} y_i$$

As described above, the STIC scaling factor 406 reflects the spatial-temporal characteristics of the current image tile 401 and the co-located image tile 402. Accordingly, the STIC scaling factor 406 can minimize the amount of distortion in the displayed image (as perceived by the human visual system) for a given rate of compression. For example, the STIC scaling factor 406 may be higher when the current image tile 401 and the co-located image tile 402 are highly correlated or when the current image tile 401 exhibits substantially greater spatial variation than the co-located image 402 (thus achieving greater compression through inter-frame coding). On the other hand, the STIC scaling factor 406 may be lower when the current image tile 401 and the co-located image tile 402 have little correlation or when the current image tile 401 exhibits substantially less spatial variation than the co-located image tile 402 (thus achieving greater image quality through intra-frame coding).

In some implementations, the STIC scaling factor 406 may be used to optimize other processes (such as quantization) that may benefit from knowledge of the spatial-temporal complexity of the video frames. For example, the STIC scaling factor 406 may provide an objective video quality metric that can be used to put more weight on regions of a video frame containing greater spatial-temporal complexity (and thus, greater information content). In some other implementations, the STIC scaling factor 406 may be used to produce a visual attention map for saliency-based video processing (such as foveated compression). Still further, in some implementations, the STIC scaling factor 406 may be used as a change (or anomaly) detection mechanism (such as for industrial control applications).

Aspects of the present disclosure further recognize that the spatial-temporal characteristics of the current image tile 401 and the co-located image tile 402 can be used to predict the type of content included in, or depicted by, the current video frame. For example, "natural" content (such as images or video captured by a camera) may have distinctly different spatial-temporal characteristics than "productivity" content (such as computer-generated graphics or images). Thus, the STIC scaling factor 406 associated with natural content may be different than the STIC scaling factor 406 associated with productivity content. In some aspects, a video encoder may predict a content type associated with each video frame based on the STIC scaling factors 406.

Figure 5:
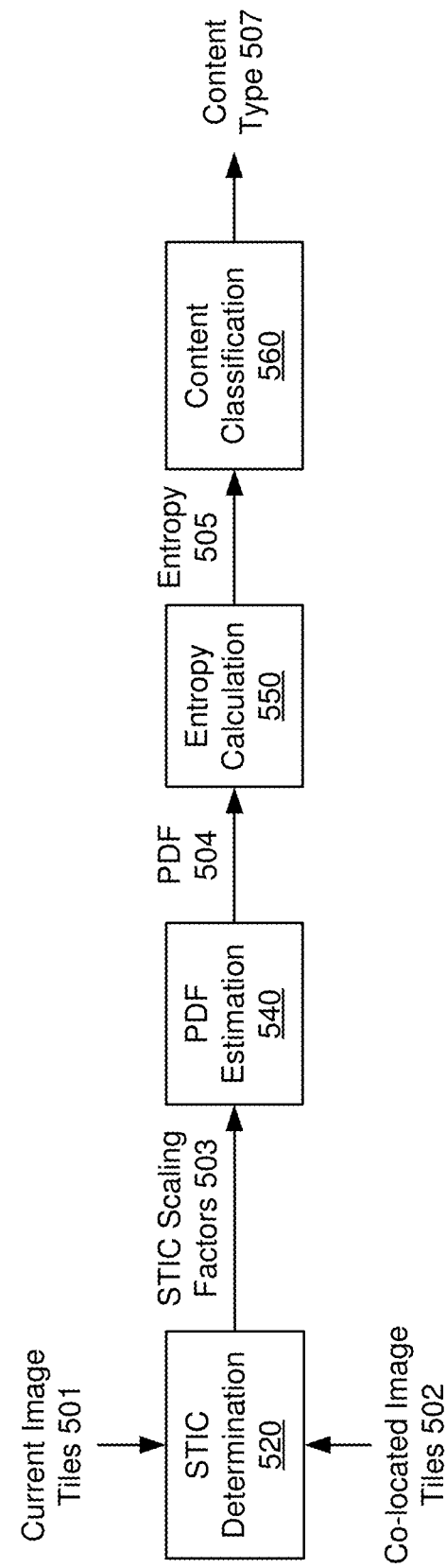
FIG. 5 shows a block diagram of an example content classification system, according to some implementations.

FIG. 5 shows a block diagram of an example content classification system 500, according to some implementations. In some implementations, the content classification system 500 may determine a content type 507 for a given video frame based on a set of current image tiles 501 representing the video frame and a set of co-located image tile 502 representing a previous video frame. The content classification system 500 includes a STIC determination component 520, a probability distribution function (PDF) estimation component 540, an entropy calculation component 550, and a content classification component 560.

The STIC determination component 520 is configured to determine a STIC scaling factor 503 associated with a current image tile 501 and a co-located image tile 502. More specifically, the STIC scaling factor 503 may be indicative of spatial-temporal characteristics of the current image tile 501 and the co-located image tile 502. In some implementations, the STIC determination component may be one example of the scaling factor calculator 400 of FIG. 4. With reference for example to FIG. 4, each current image tile 501 may be one example of the current image tile 401, each co-located image tile 502 may be one example of the co-located image tile 402, and the STIC scaling factor 503 may be one example of the STIC scaling factor 406.

Figure 6A:
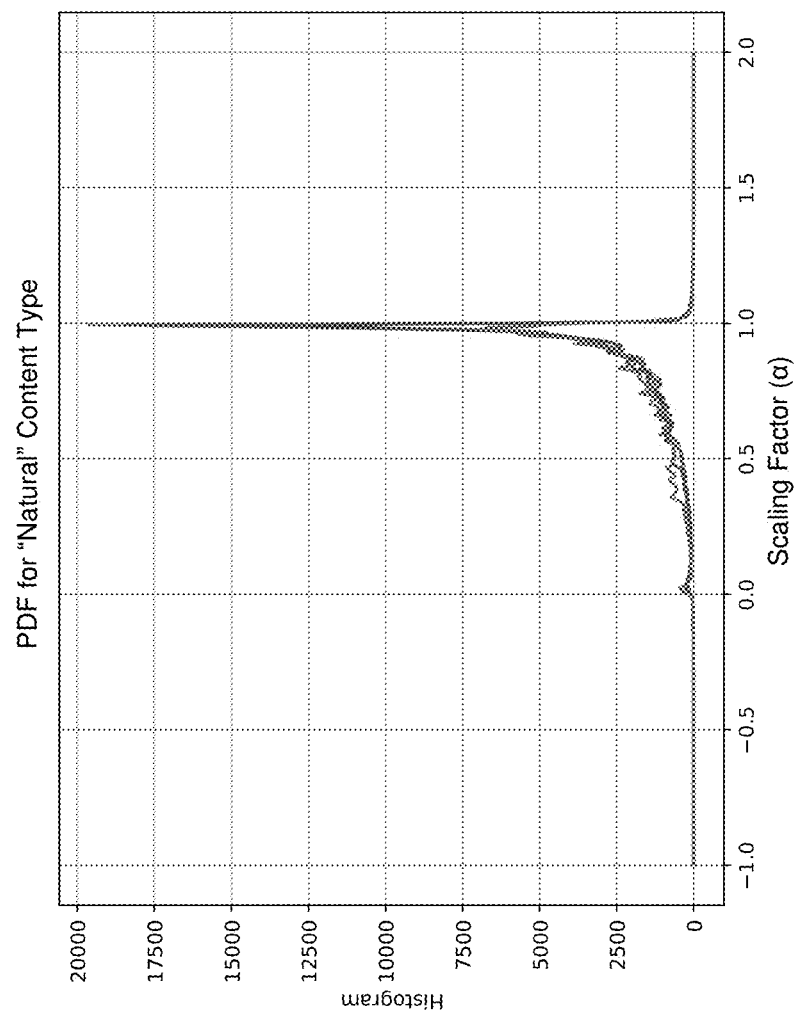
FIG. 6A shows a histogram depicting a probability density function (PDF) associated with an example distribution of scaling factors for a frame of natural-type content.
Figure 6B:
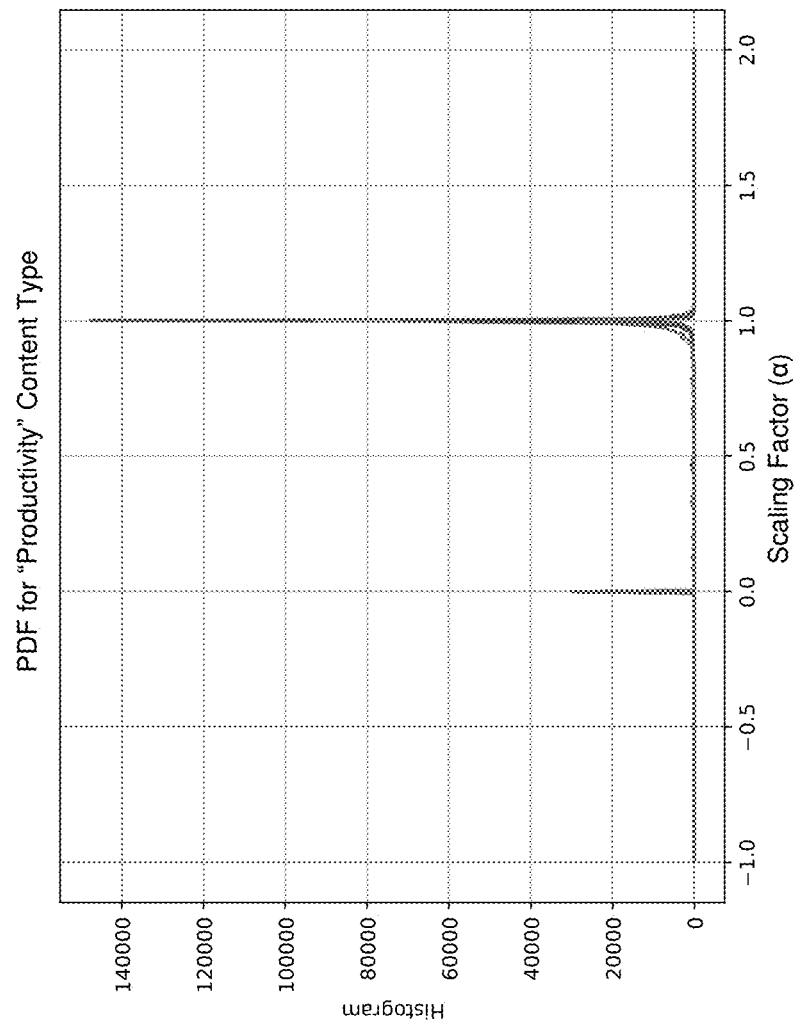
FIG. 6B shows a histogram depicting a PDF associated with an example distribution of scaling factors for a frame of productivity-type content.

The PDF estimation component 540 is configured to aggregate the STIC scaling factors 503 for the given video frame and estimate a probability density function (PDF) 504 associated with the distribution of STIC scaling factors 503 for the given video frame. Example suitable PDFs include histograms and parametric probability distributions, among other examples. FIG. 6A shows a histogram 600 depicting a PDF associated with an example distribution of scaling factors ($\alpha$) for a frame of natural-type content. FIG. 6B shows a histogram 610 depicting a PDF associated with an example distribution of scaling factors ($\alpha$) for a frame of productivity-type content.

The entropy calculation component 550 is configured to calculate an entropy 505 of the STIC scaling factors 503 for the given video frame. Example suitable entropies include Rényi entropy, Shannon entropy, and Pai entropy, among other examples. The entropy 505 indicates the randomness or uncertainty of the STIC scaling factors 503. Aspects of the present disclosure recognize that the entropies associated with certain content types may be different than the entropies associated with other content types. With reference for example to FIGS. 6A and 6B, the scaling factors $\alpha$ associated with natural-type content are much more likely to have values between 0 and 1 than the scaling factors $\alpha$ associated with productivity-type content (which are generally equal to either 0 or 1). Thus, the entropy of the scaling factors associated with natural-type content may be higher than the entropy of the scaling factors associated with productivity-type content.

The content classification component 560 is configured to determine a content type 507 classification for the given video frame based on the calculated entropy 505. Example suitable classification models include logistic, supper-vector machine (SVM), and Bayesian models, among other examples. In some implementations, the content classification component 560 may compare the calculated entropy 505 to one or more thresholds (also referred to as "discriminators") to determine the content type 507. For example, video frames associated with entropies 505 above a given entropy threshold may be classified as natural-type content whereas video frames associated with entropies 505 below the entropy threshold may be classified as productivity-type content.

Figure 7:
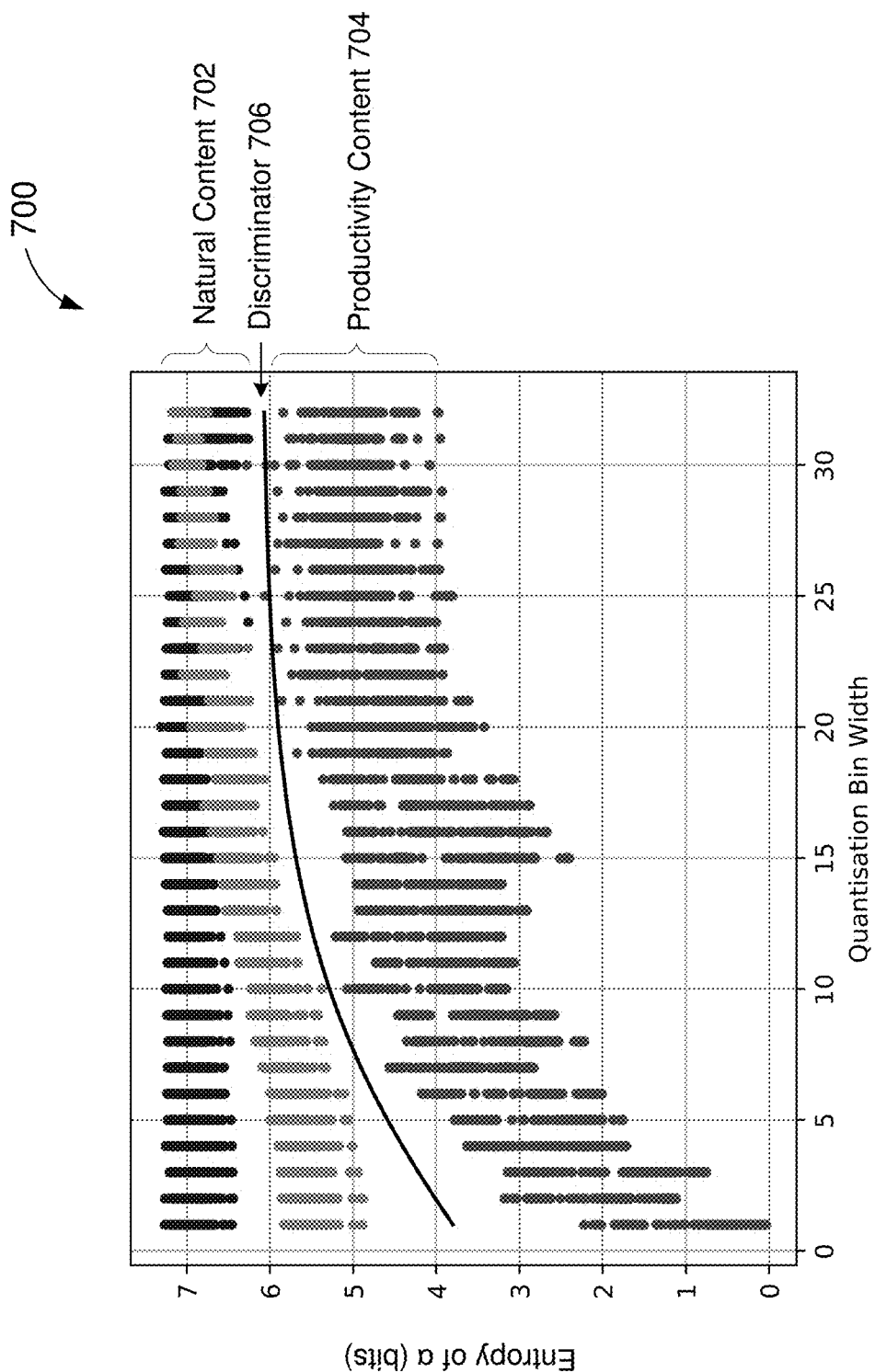
FIG. 7 shows an entropy plot depicting example entropies of scaling factors associated with natural-type content and productivity-type content.

FIG. 7 shows an entropy plot 700 depicting example entropies of scaling factors ($\alpha$) associated with natural-type content 702 and productivity-type content 704. More specifically, FIG. 7 shows how the entropies associated with the natural-type content 702 and the productivity-type content 704 vary with respect to different quantization bin widths (representing different levels of quantization applied to the video frame). In some implementations, the scaling factors $\alpha$ associated with the natural-type content 702 may be one example of the scaling factors $\alpha$ depicted in FIG. 6A and the scaling factors $\alpha$ associated with the productivity-type content 704 may be one example of the scaling factors $\alpha$ depicted in FIG. 6B.

As shown in FIG. 7, the entropies of the scaling factors $\alpha$ associated with the natural-type content 702 are distinctly higher than the entropies of the scaling factors $\alpha$ associated with the productivity-type content 704 for any quantization bin width. As such, a discriminator curve 706 can be fitted to the entropy plot 700, which separates the entropies associated with the natural-type content 702 from the entropies associated with the productivity-type content 704. Thus, if the entropy calculated for a given video frame (such as the entropy 505 of FIG. 5) is above the discriminator curve 706, for a given quantization level, the video frame may be classified as natural-type content 702 (representing the content type 507). By contrast, if the calculated entropy is below the discriminator curve 706 the video frame may be classified as productivity-type content 704. In some implementations, the discriminator curve (d) 706 can be expressed as a function of the quantization bin width (z):

$$d(z) = \frac{c}{1 + e^{-(az+b)}}$$

where a, b, and c are parameters that can be adjusted to fit the discriminator curve 706 to any data set (representing any content types). In the example of FIG. 7, a=0.15, b=0.35, and c=6.1 are experimentally fitted parameters based on actual video data containing natural-type content 702 and actual video data containing productivity-type content 704.

In some aspects, knowledge of the content-type classification may be used to improve or optimize various coding or processing operations performed on the given video frame. In some implementations, the classification may be used by a quantizer to determine a required data rate and quality for a given video frame (such as for rate control). In some other implementations, the classification may be used to create various quantization profiles (including quantization parameters for various frequency bands). In some other implementations, the classification may be used to determine the number of frequency bands (or layers) in a pyramidal codec. In some other implementations, the classification may be used to determine the frequency scanning order in block-based codecs. In some other implementations, the classification may be used in the selection of pre- and post-processing filters. In some other implementations, the classification may be used in the selection or modeling of probability tables associated with entropy coding. Still further, in some implementations, the classification may be used in a rate distortion optimization (RDO) model (such as to optimize jointly varying encoding tools).

In some other aspects, the content classification operation of the present implementations (such as performed by the content classification system 500 of FIG. 5) may be implemented as a pre-processing step in various image processing applications (such as different de-noising filters applied to different content types). In some other aspects, the content-type classification may aid visual recognition in computer vision applications. In some other aspects, the content-type classification may aid semantic image segmentation and retrieval. In some other aspects, the content-type classification may be used for image metadata creation or extraction. Still further, in some aspects, the content-type classification may be used as a prior (or hyperprior) in latent variable models of images or videos (such as in a generative adversarial network (GAN) or variational autoencoder (VAE) neural network).

Figure 8:
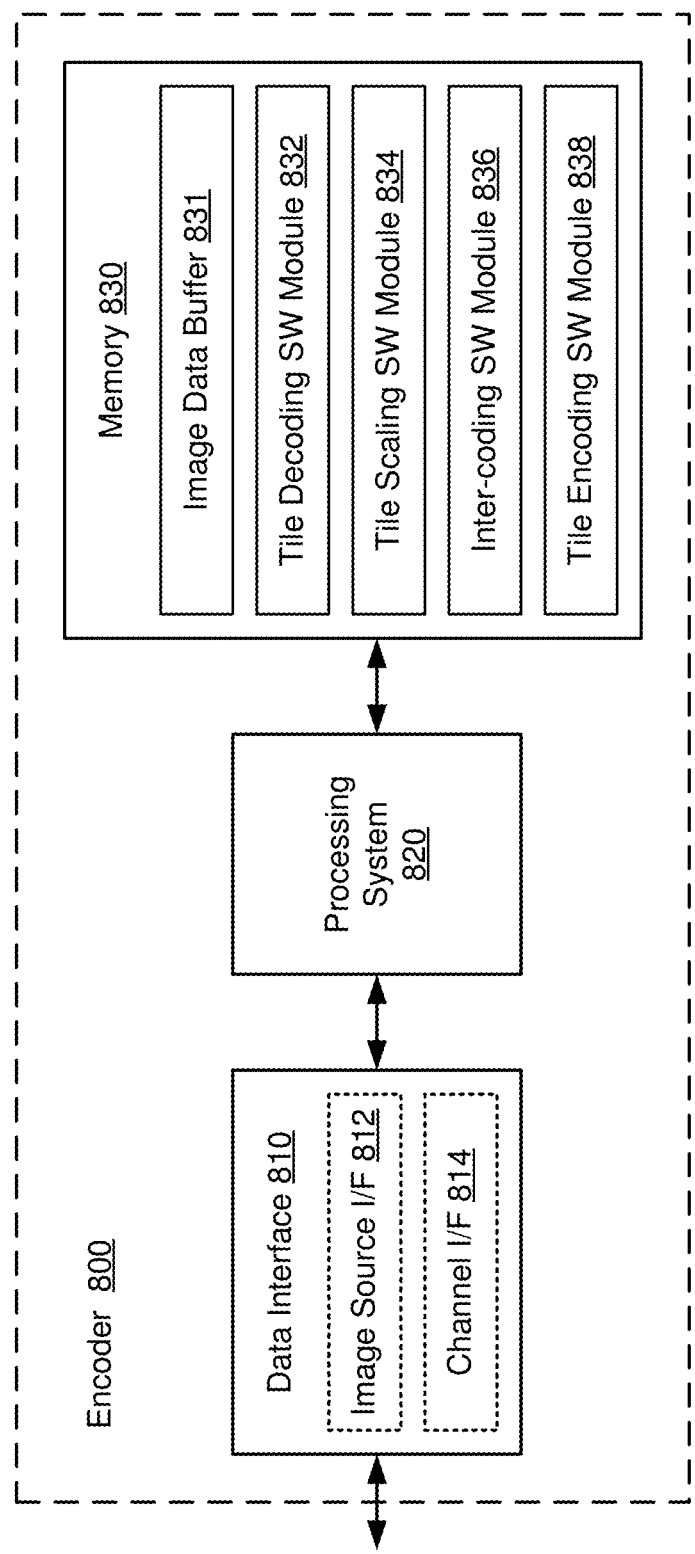
FIG. 8 shows a block diagram of an example encoder, according to some implementations.

FIG. 8 shows a block diagram of an encoder 800, according to some implementations. In some implementations, the encoder 800 may be one example of the video encoder 210 of FIG. 2 or the video encoding system 300 of FIG. 3. More specifically, the encoder 800 may be configured to encode image tiles, as codewords, based on a recursive hybrid inter-coding process.

In some implementations, the encoder 800 may include a data interface 810, a processing system 820, and a memory 830. The data interface 810 is configured to receive image data from an image source and output codewords, representing encoded image data, to a communication channel. In some aspects, the data interface 810 may include an image source interface (I/F) 812 to interface with the image source and a channel interface 814 to interface with the communication channel. In some implementations, the channel interface 814 may transmit, over the communication channel, one or more first codewords associated with a first image in a sequence of images and one or more second codewords associated with a second image, following the first image, in the sequence of images.

The memory 830 may include an image data buffer 831 to store any image data or intermediate data associated with the encoding operation. The memory 830 also may include a non-transitory computer-readable medium (including one or more nonvolatile memory elements, such as EPROM, EEPROM, Flash memory, a hard drive, and the like) that may store at least the following software (SW) modules:
- a tile decoding SW module 832 to decode the one or more first codewords as a plurality of first pixel values according to one or more coding schemes;
- a tile scaling SW module 834 to scale the plurality of first pixel values by a scaling factor associated with one or more properties of the communication channel;
- an inter-coding SW module 836 to obtain a plurality of difference values representing differences between the plurality of scaled first pixel values and a plurality of second pixel values, respectively, associated with the second image; and
- a tile encoding SW module 838 to encode the plurality of difference values as the one or more second codewords according to the one or more coding schemes.

Each software module includes instructions that, when executed by the processing system 820, causes the encoder 800 to perform the corresponding functions.

The processing system 820 may include any suitable one or more processors capable of executing scripts or instructions of one or more software programs stored in the encoder 800 (such as in memory 830). For example, the processing system 820 may execute the tile decoding SW module 832 to decode the one or more first codewords as a plurality of first pixel values according to one or more coding schemes. The processing system 820 also may execute the tile scaling SW module 834 to scale the plurality of first pixel values by a scaling factor associated with one or more properties of the communication channel. Further, the processing system 820 may execute the inter-coding SW module 836 to obtain a plurality of difference values representing differences between the plurality of scaled first pixel values and a plurality of second pixel values, respectively, associated with the second image. Still further, the processing system 820 may execute the tile encoding SW module 838 to encode the plurality of difference values as the one or more second codewords according to the one or more coding schemes.

Figure 9:
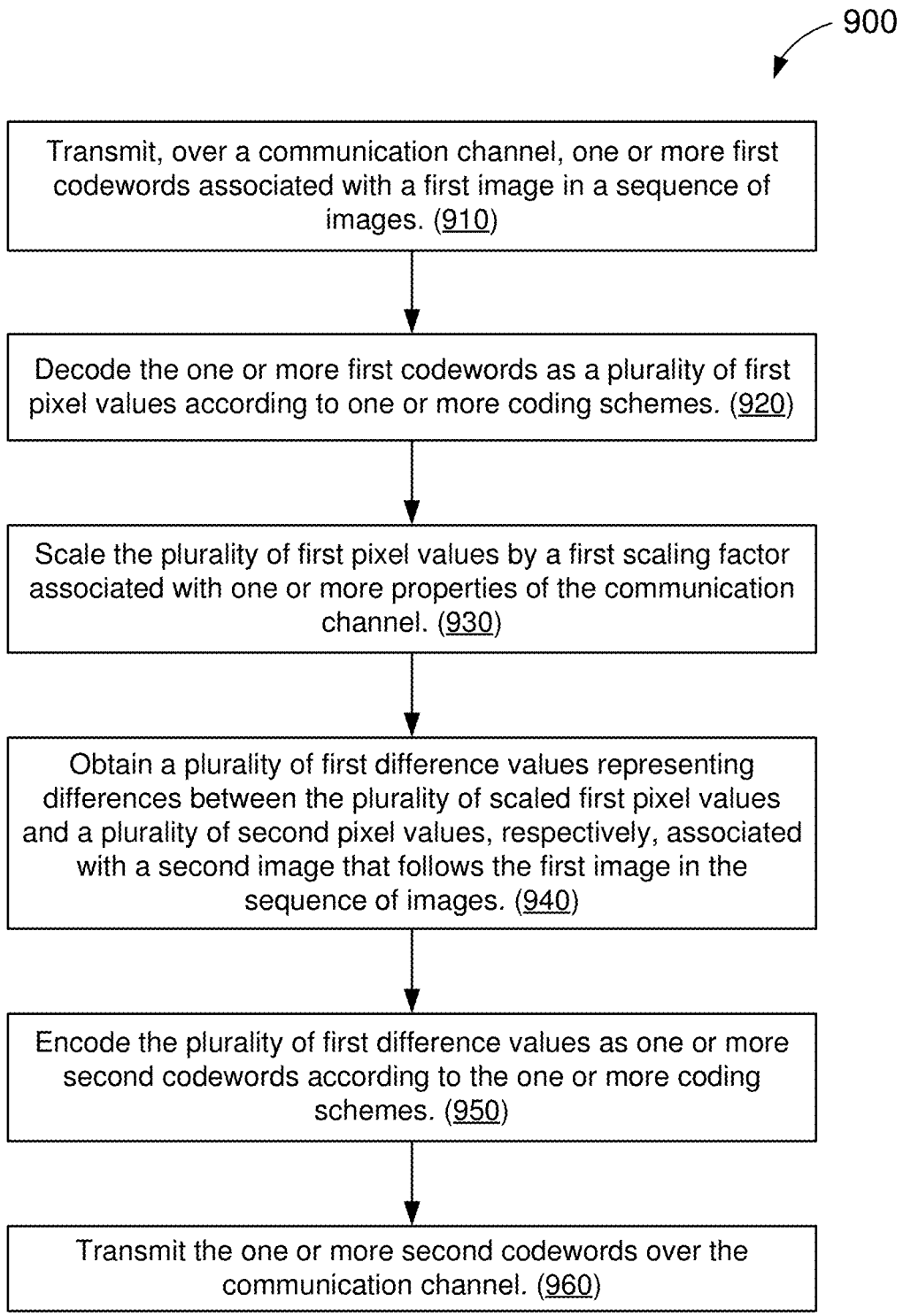
FIG. 9 shows an illustrative flowchart depicting an example operation for video coding, according to some implementations.

FIG. 9 shows an illustrative flowchart depicting an example operation 900 for video coding, according to some implementations. In some implementations, the example operation 900 may be performed by a video encoder such as the video encoder 210 of FIG. 2 or the video encoding system 300 of FIG. 3.

The video encoder transmits, over a communication channel, one or more first codewords associated with a first image in a sequence of images (910). The video encoder decodes the one or more first codewords as a plurality of first pixel values according to one or more coding schemes (920). The video encoder scales the plurality of first pixel values by a first scaling factor ($\alpha_1$) associated with one or more properties of the communication channel (930). In some implementations, the one or more properties may include a channel loss associated with the communication channel. In some other implementations, the one or more properties may include a channel capacity associated with the communication channel. In some aspects, the first scaling factor $\alpha_1$ may be greater than or equal to zero and less than or equal to 1.

The video encoder further obtains a plurality of first difference values representing differences between the plurality of scaled first pixel values and a plurality of second pixel values, respectively, associated with a second image that follows the first image in the sequence of images (940). The video encoder encodes the plurality of first difference values as one or more second codewords according to the one or more coding schemes (950). The video encoder transmits the one or more second codewords over the communication channel (960).

In some aspects, the video encoder may further determine the first scaling factor $\alpha_1$ based at least in part on the plurality of first pixel values and the plurality of second pixel values. In some implementations, the determining of the first scaling factor $\alpha_1$ may include determining a standard deviation ($\sigma_x$) of a random variable (X) associated with the plurality of first pixel values; determining a standard deviation ($\sigma_y$) of a random variable (Y) associated with the plurality of second pixel tiles; and determining a correlation ($\rho$) between the random variable X and the random variable Y, where $$\rho \triangleq \frac{E[XY] - E[X]E[Y]}{\sqrt{E[X^2] - E[X]^2}\sqrt{E[Y^2] - E[Y]^2}}$$

and $$\alpha_1 = \rho \frac{\sigma_X}{\sigma_Y}.$$

In some aspects, the video encoder may further determine a content type associated with the second image based at least in part on the first scaling factor $\alpha_1$. In some implementations, the plurality of second pixel values may represent a first image tile of a plurality of image tiles associated with the second image. In some implementations, the determining of the content type may include determining a plurality of scaling factors associated with the plurality of image tiles, respectively, where the plurality of scaling factors includes the first scaling factor $\alpha_1$; determining a PDF associated with the plurality of scaling factors; and determining an entropy of the scaling factors based on the PDF, where the content type is determined based on the entropy of the scaling factors.

In some aspects, the video encoder may further decode the one or more second codewords as a plurality of third pixel values according to the one or more coding schemes; scale the plurality of third pixel values by a second scaling factor ($\alpha_2$); obtain a plurality of second difference values representing differences between the plurality of scaled third pixel values and a plurality of fourth pixel values, respectively, associated with a third image that follows the second image in the sequence of images; encode the plurality of second difference values as one or more third codewords according to the one or more coding schemes; and transmit the one or more third codewords over the communication channel. In some implementations, the second scaling factor $\alpha_2$ may be different than the first scaling factor $\alpha_1$.

In some aspects, the video encoder may further transmit, over the communication channel, one or more third codewords associated with the first image; decode the one or more third codewords as a plurality of third pixel values according to the one or more coding schemes; scale the plurality of third pixel values by a second scaling factor ($\alpha_2$); obtain a plurality of second difference values representing differences between the plurality of scaled third pixel values and a plurality of fourth pixel values, respectively, associated with the second image; encode the plurality of second difference values as one or more third codewords according to the one or more coding schemes; and transmit the one or more third codewords over the communication channel. In some implementations, the second scaling factor $\alpha_2$ may be different than the first scaling factor $\alpha_1$.

Figure 10:
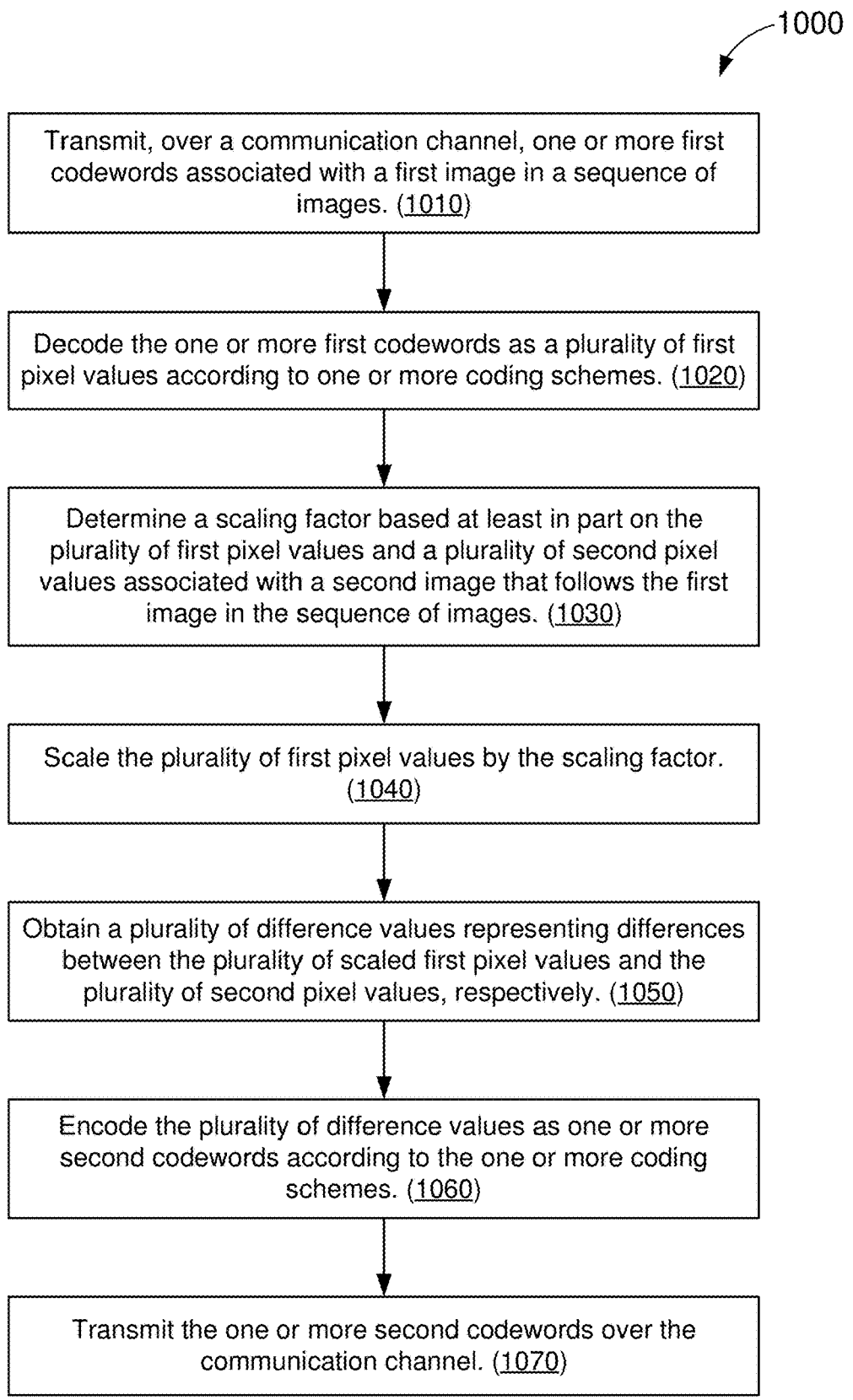
FIG. 10 shows another illustrative flowchart depicting an example operation for video coding, according to some implementations.

FIG. 10 shows another illustrative flowchart depicting an example operation 1000 for video coding, according to some implementations. In some implementations, the example operation 1000 may be performed by a video encoder such as the video encoder 210 of FIG. 2 or the video encoding system 300 of FIG. 3.

The video encoder transmits, over a communication channel, one or more first codewords associated with a first image in a sequence of images (1010). The video encoder decodes the one or more first codewords as a plurality of first pixel values according to one or more coding schemes (1020). The video encoder determines a scaling factor ($\alpha$) based at least in part on the plurality of first pixel values and a plurality of second pixel values associated with a second image that follows the first image in the sequence of images (1030). The video encoder scales the plurality of first pixel values by the scaling factor $\alpha$ (1040). The video encoder obtains a plurality of difference values representing differences between the plurality of scaled first pixel values and the plurality of second pixel values, respectively (1050). The video encoder encodes the plurality of difference values as one or more second codewords according to the one or more coding schemes (1060). The video encoder further transmits the one or more second codewords over the communication channel (1070).

In some implementations, the determining of the scaling factor $\alpha$ may include determining a standard deviation ($\sigma_x$) of a random variable (X) associated with the plurality of first pixel values; determining a standard deviation ($\sigma_y$) of a random variable (Y) associated with the plurality of second pixel tiles; and determining a correlation ($\rho$) between the random variable X and $$\rho \triangleq \frac{E[XY] - E[X]E[Y]}{\sqrt{E[X^2] - E[X]^2}\sqrt{E[Y^2] - E[Y]^2}}$$

and $$\alpha = \rho \frac{\sigma_X}{\sigma_Y}.$$

In some implementations, the plurality of second pixel values may represent a first image tile of a plurality of image tiles associated with the second image. In some aspects, the video encoder may further determine a plurality of scaling factors associated with the plurality of image tiles, respectively, where the plurality of scaling factors includes the scaling factor $\alpha$; determine a PDF associated with the plurality of scaling factors; determine an entropy of the scaling factors based on the PDF; and determine a content type associated with the second image based on the entropy of the scaling factors.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the disclosure.

The methods, sequences or algorithms described in connection with the aspects disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor.

In the foregoing specification, embodiments have been described with reference to specific examples thereof. It will, however, be evident that various modifications and changes may be made thereto without departing from the broader scope of the disclosure as set forth in the appended claims. The specification and drawings are, accordingly, to be regarded in an illustrative sense rather than a restrictive sense.

What is claimed is:

1. A method for classifying image content, comprising:
receiving a plurality of first pixel values associated with a first image in a sequence of images;
receiving a plurality of second pixel values associated with a second image that follows the first image in the sequence of images;
determining an amount of spatial variation among the plurality of first pixel values;
determining an amount of spatial variation among the plurality of second pixel values;

determining an amount of temporal change between the plurality of first pixel values and the plurality of second pixel values;

determining a scaling factor ($\alpha$) associated with the plurality of second pixel values based on the amount of spatial variation among the plurality of first pixel values, the amount of spatial variation among the plurality of second pixel values, and the amount of temporal change between the plurality of first pixel values and the plurality of second pixel values; and determining a content type associated with the second image based at least in part on the scaling factor $\alpha$.

2. The method of claim 1, wherein the scaling factor $\alpha$ has a value greater than or equal to 0 and less than or equal to 1.

3. The method of claim 1, wherein the amount of spatial variation among the plurality of first pixel values comprises a standard deviation ($\sigma_x$) of the plurality of first pixel values and the amount of spatial variation among the plurality of second pixel values comprises a standard deviation ($\sigma_y$) of the plurality of second pixel values.

4. The method of claim 1, wherein the amount of temporal change between the plurality of first pixel values and the plurality of second pixel values comprises a correlation ($\rho$) between the plurality of first pixel values and the plurality of second pixel values.

5. The method of claim 1, wherein the plurality of second pixel values represents an image tile of a plurality of image tiles associated with the second image.

6. The method of claim 5, further comprising:
determining a plurality of scaling factors associated with the plurality of image tiles, respectively, the plurality of scaling factors including the scaling factor $\alpha$;
determining a probability density function (PDF) associated with the plurality of scaling factors; and
determining an entropy of the plurality of scaling factors based on the PDF.

7. The method of claim 6, wherein the determining of the content type comprises:
determining whether the entropy of the plurality of scaling factors is higher than an entropy threshold.

8. The method of claim 7, wherein the content type is determined to be a first content type responsive to determining that the entropy is higher than the entropy threshold and the content type is determined to be a second content type responsive to determining that the entropy is not higher than the entropy threshold.

9. The method of claim 1, wherein the first content type is associated with images or video captured by a camera.

10. The method of claim 1, wherein the second content type is associated with computer-generated graphics or images.

11. A system for classifying image content, comprising:
a processing system; and
a memory storing instructions that, when executed by the processing system, cause the system to:
receive a plurality of first pixel values associated with a first image in a sequence of images;
receive a plurality of second pixel values associated with a second image that follows the first image in the sequence of images;
determine an amount of spatial variation among the plurality of first pixel values;
determine an amount of spatial variation among the plurality of second pixel values;
determine an amount of temporal change between the plurality of first pixel values and the plurality of second pixel values;
determine a scaling factor ($\alpha$) associated with the plurality of second pixel values based on the amount of spatial variation among the plurality of first pixel values, the amount of spatial variation among the plurality of second pixel values, and the amount of temporal change between the plurality of first pixel values and the plurality of second pixel values; and
determine a content type associated with the second image based at least in part on the scaling factor $\alpha$.

12. The system of claim 11, wherein the scaling factor $\alpha$ has a value greater than or equal to 0 and less than or equal to 1.

13. The system of claim 11, wherein the amount of spatial variation among the plurality of first pixel values comprises a standard deviation ($\sigma_x$) of the plurality of first pixel values and the amount of spatial variation among the plurality of second pixel values comprises a standard deviation ($\sigma_y$) of the plurality of second pixel values.

14. The system of claim 11, wherein the amount of temporal change between the plurality of first pixel values and the plurality of second pixel values comprises a correlation ($\rho$) between the plurality of first pixel values and the plurality of second pixel values.

15. The system of claim 11, wherein the plurality of second pixel values represents an image tile of a plurality of image tiles associated with the second image.

16. The system of claim 15, wherein execution of the instructions further causes the system to:
determine a plurality of scaling factors associated with the plurality of image tiles, respectively, the plurality of scaling factors including the scaling factor $\alpha$;
determine a probability density function (PDF) associated with the plurality of scaling factors; and
determine an entropy of the plurality of scaling factors based on the PDF.

17. The system of claim 16, wherein the determining of the content type comprises:
determining whether the entropy of the plurality of scaling factors is higher than an entropy threshold.

18. The system of claim 17, wherein the content type is determined to be a first content type responsive to determining that the entropy is higher than the entropy threshold and the content type is determined to be a second content type responsive to determining that the entropy is not higher than the entropy threshold.

19. An encoder, comprising:
a processing system; and
a memory storing instructions that, when executed by the processing system, cause the encoder to:
transmit, over a communication channel, one or more first codewords associated with a first image in a sequence of images;
decode the one or more first codewords as a plurality of first pixel values according to one or more coding schemes;
determine a scaling factor ($\alpha$) based at least in part on the plurality of first pixel values and a plurality of second pixel values associated with a second image that follows the first image in the sequence of images;
scale the plurality of first pixel values by the scaling factor $\alpha$;

obtain a plurality of difference values representing differences between the plurality of scaled first pixel values and the plurality of second pixel values, respectively;

encode the plurality of difference values as one or more second codewords according to the one or more coding schemes; and transmit the one or more second codewords over the communication channel.

20. The encoder of claim 19, wherein the plurality of second pixel values represents an image tile of a plurality of image tiles associated with the second image, execution of the instructions further causing the encoder to:

determine a plurality of scaling factors associated with the plurality of image tiles, respectively, the plurality of scaling factors including the scaling factor $\alpha$;

determine a probability density function (PDF) associated with the plurality of scaling factors;

determine an entropy of the scaling factors based on the PDF; and determine a content type associated with the second image based on the entropy of the scaling factors.

* * * * *